(12) United States Patent
Yang et al.

(10) Patent No.: US 9,363,600 B2
(45) Date of Patent: Jun. 7, 2016

(54) METHOD AND APPARATUS FOR IMPROVED RESIDUAL ECHO SUPPRESSION AND FLEXIBLE TRADEOFFS IN NEAR-END DISTORTION AND ECHO REDUCTION

(71) Applicant: Apple Inc., Cupertino, CA (US)

(72) Inventors: Qing Yang, San Jose, CA (US); Sean Anthony Ramprashad, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 230 days.

(21) Appl. No.: 14/289,378

(22) Filed: May 28, 2014

(65) Prior Publication Data
US 2015/0350777 A1 Dec. 3, 2015

(51) Int. Cl.
*H04R 3/00* (2006.01)
*H04R 3/02* (2006.01)
*H04M 9/08* (2006.01)

(52) U.S. Cl.
CPC .. *H04R 3/02* (2013.01); *H04M 9/08* (2013.01)

(58) Field of Classification Search
CPC ............ H04R 3/00; H04R 3/02; H04R 3/002; H04R 2410/01; H04R 2410/03; H04R 2227/001; H04R 2227/005; H04R 2227/007; H04R 2420/082; H04R 2420/02; H04R 2420/08; H04R 29/007; G10K 2210/505; G10K 11/178; G10K 11/1784; H04M 3/002; H04B 3/20; H04B 3/23; H04B 7/015
USPC .................................. 381/71.1, 73.1, 94.1, 66
See application file for complete search history.

(56) References Cited

U.S. PATENT DOCUMENTS

| 8,208,621 | B1 | 6/2012 | Hsu |
| 8,472,616 | B1 | 6/2013 | Jiang |
| 2014/0105410 | A1 | 4/2014 | Zhan |
| 2014/0112488 | A1 | 4/2014 | Kim et al. |

OTHER PUBLICATIONS

Benesty, et al. "A New Class of Doubletalk Detectors Based on Cross-Correlation." *IEEE Transactions on Speech and Audio Processing*, vol. 8, No. 2 (Mar. 2000). pp. 168-172. 5 pages.
(Continued)

*Primary Examiner* — Paul S Kim
*Assistant Examiner* — Sabrina Diaz
(74) *Attorney, Agent, or Firm* — Blakely, Sokoloff, Taylor & Zafman LLP (57) ABSTRACT

A system and method is described for estimating residual echo and performing residual echo suppression on a signal. In particular, the system and method described herein: 1) provides a more accurate coherence-based approach where the sub-band nature of coherence-based residual echo estimation is leveraged using sub-band-based coherence measures and upper-bound envelopes to guide residual echo estimates; 2) provides joint estimation of the residual echo and a background stationary noise-floor; 3) provides more accurate residual echo estimation by combining the above two measures with information on near-end activity to selectively adjust the residual-echo estimation in sub-bands; and 4) provides improved control of near-end distortion by leveraging the noise-floor estimate and the internally calculated signal-to-echo ratios as additional guides/limits to help balance, flexibly, and as needed, near-end distortion with residual echo suppression. The resultant residual echo suppressor design provides significant improvement in both residual echo suppression and background noise preservation.

26 Claims, 7 Drawing Sheets

(56) References Cited

OTHER PUBLICATIONS

Ephraim et al. "Speech Enhancement Using a Minimum Mean-Square Error Short-Time Spectral Amplitude Estimator." *IEEE Transactions on Acoustics, Speech, and Signal Processing*, vol. ASSP-32, No. 6 (Dec. 1984). pp. 1109-1121. 13 pages.

Enzner, et al. "Unbiased Residual Echo Power Estimation for Hands-Free Telephony." *IEEE International Conference on Acoustics, Speech, and Signal Processing (ICASSP)*. IEEE (2002). pp. II-1893-1896. 4 pages.

Hoshuyama, et al. "An Acoustic Echo Suppressor Based on a Frequency-Domain Model of Highly Nonlinear Residual Echo." *IEEE International Conference on Acoustics, Speech and Signal Processing, ICASSP 2006 proceedings*. IEEE (2006). pp. v-269-272. 4 pages.

METHOD AND APPARATUS FOR IMPROVED RESIDUAL ECHO SUPPRESSION AND FLEXIBLE TRADEOFFS IN NEAR-END DISTORTION AND ECHO REDUCTION

FIELD

A system and method is disclosed for estimating residual echo and performing residual echo suppression on a signal using a sub-band analysis. Other embodiments are also described.

BACKGROUND

Communication systems involve a near-end system and a far-end system, which communicate over a medium. For example, a near-end system may detect sound produced by one or more sound sources at the near-end location and transmit this detected sound as an uplink signal to a far-end system at another location.

Ideally, the near-end system only detects the sound from an intended sound source (e.g., a user). However, in many scenarios, the detected sound at the near-end may include, in addition to sound from the intended sound source, far-end sound received from a downlink signal and played-back by the near-end system through a speaker (i.e., sound that may be perceived at the far-end as acoustic echo). To maintain an effective communication system, this acoustic echo needs to be controlled such that the users of such a communication system may clearly understand their distant counterpart.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

A combination of linear and non-linear echo reduction techniques may be used to reduce echo during two way communications. For example, linear echo cancelers (ECs) may reduce the level of echo substantially (e.g., by 20 to 40 dB). However, even at such levels the remaining echo may still be perceptible in the signal to be sent to a far-end system. Non-linear techniques, such as those in residual echo suppressors (RESs), try to reduce this echo further. However, unlike a linear EC, RESs have a number of challenges including: 1) the estimation of the remaining echo (i.e., the residual echo) remaining after the EC and the desired near-end signal in the primary signal (i.e., the signal that will be sent to the far-end system) and 2) how to suppress this undesired residual echo without unduly harming the desired near-end component of the signal.

In particular, coherence-based residual-echo power spectral estimation is often used to estimate the residual echo. However, some coherence-based residual-echo power spectral estimation techniques may not accurately estimate the true residual echo present in the post-EC processed signal. This lack of accuracy may be somewhat a fundamental problem since echo remaining after linear echo cancelation should be uncorrelated with a linear echo estimation or a reference signal from the linear EC, in particular for a well designed and operating EC. Though this may be compensated for somewhat by measurement-based residual echo estimation, such measurement-based approaches may be hardware/application/scenario dependent and time consuming to calibrate. Furthermore, depending on the application, there is a balance between a RES's action in residual-echo suppression and its effect due to such actions on near-end distortion, for which adjustment may be desired given requirements of the application.

To address these issues/concerns, the systems and methods described herein: 1) provide a better coherence-based approach where the sub-band nature of coherence-based residual echo estimation is leveraged using sub-band-based coherence measures and upper-bound envelopes to guide better residual echo estimates; 2) provide joint estimation of the residual echo and a background stationary noise-floor; 3) provide better residual echo estimation by combining the above two measures with information on near-end activity (e.g., double-talk measures) to selectively adjust the residual-echo estimation in sub-bands; and 4) provide improved control of near-end distortion by leveraging the noise-floor estimate, or some scaled version of this floor, and the internally calculated signal-to-echo ratios, as additional guides/limits to help balance, flexibly, and as needed, near-end distortion with residual echo suppression. The resultant RES design and approach shows significant improvement in both residual echo suppression and background noise preservation.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
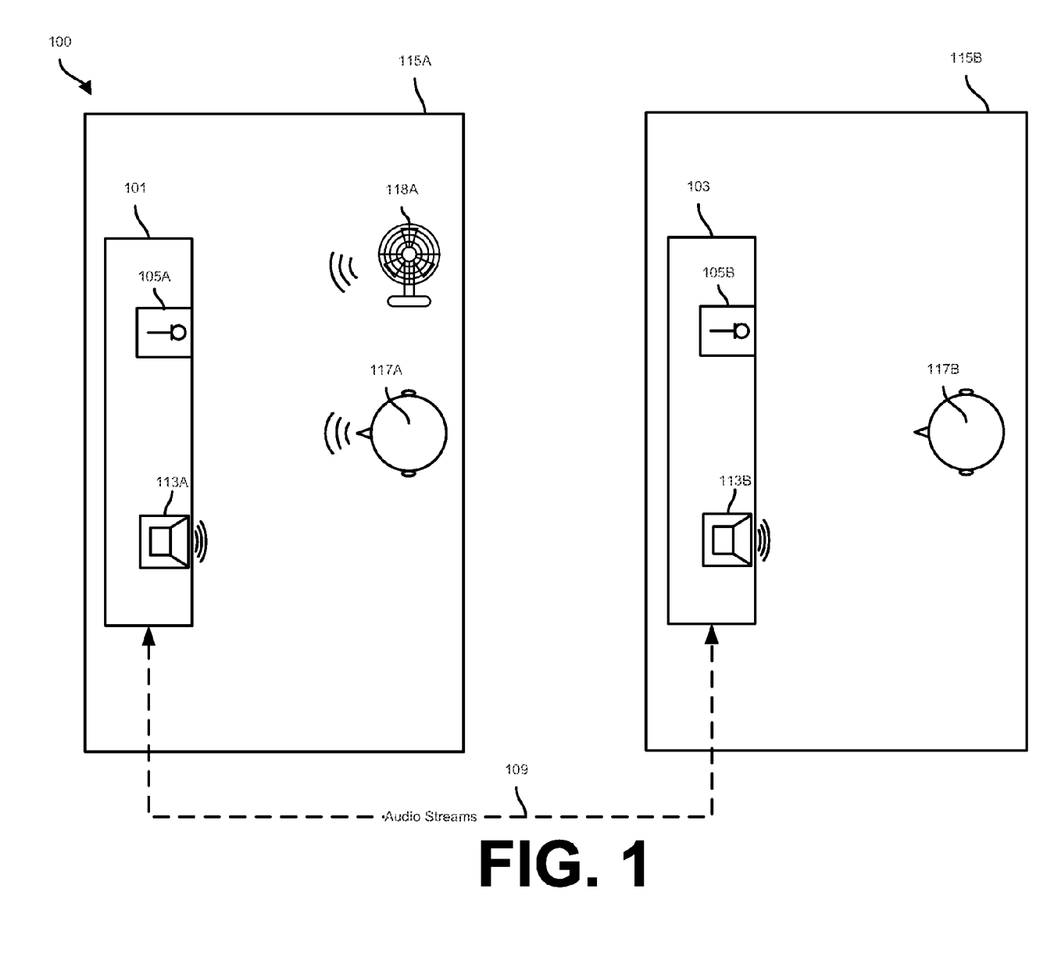
FIG. 1 shows a conference system according to one embodiment that transfers audio signals/streams between a near-end computing system and a far-end computing system.

FIG. 1 shows a conference system 100 that transfers audio signals/streams between a near-end computing system 101 and a far-end computing system 103. The audio streams may be captured by each of the near-end and far-end computing systems 101 and 103 using associated microphones 105A and 105B. The conference system 100 may synchronously or asynchronously transfer audio signals/streams between the near-end and far-end systems 101 and 103 over the data connection 109 such that each of these signals/streams may be played through corresponding loudspeakers 113A/113B. Each element of the conference system 100 will be described by way of example below. In some embodiments, the conference system 100 may include more elements than those shown and described.

As shown in FIG. 1, the near-end system 101 may be located at a near-end location 115A and the far-end system 103 may be located at a far-end location 115B. For example, the near-end location 115A may be a business conference room being utilized by the near-end user 117A and the far-end location 115B may be a business conference room being utilized by the far-end user 117B. However, in some embodiments, the near-end location 115A and/or the far-end location 115B may be outdoor areas. The near-end and far-end locations 115A and 115B may be separated by any distance (e.g., 500 feet or 500 miles) and the near-end system 101 and the far-end system 103 may communicate with each other using the data connection 109.

The data connection 109 may be any combination of wired and wireless mediums operating in a distributed or a point-to-point network. For example, the data connection 109 may utilize a combination of wired and wireless protocols and standards, including the IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards.

Figure 2:
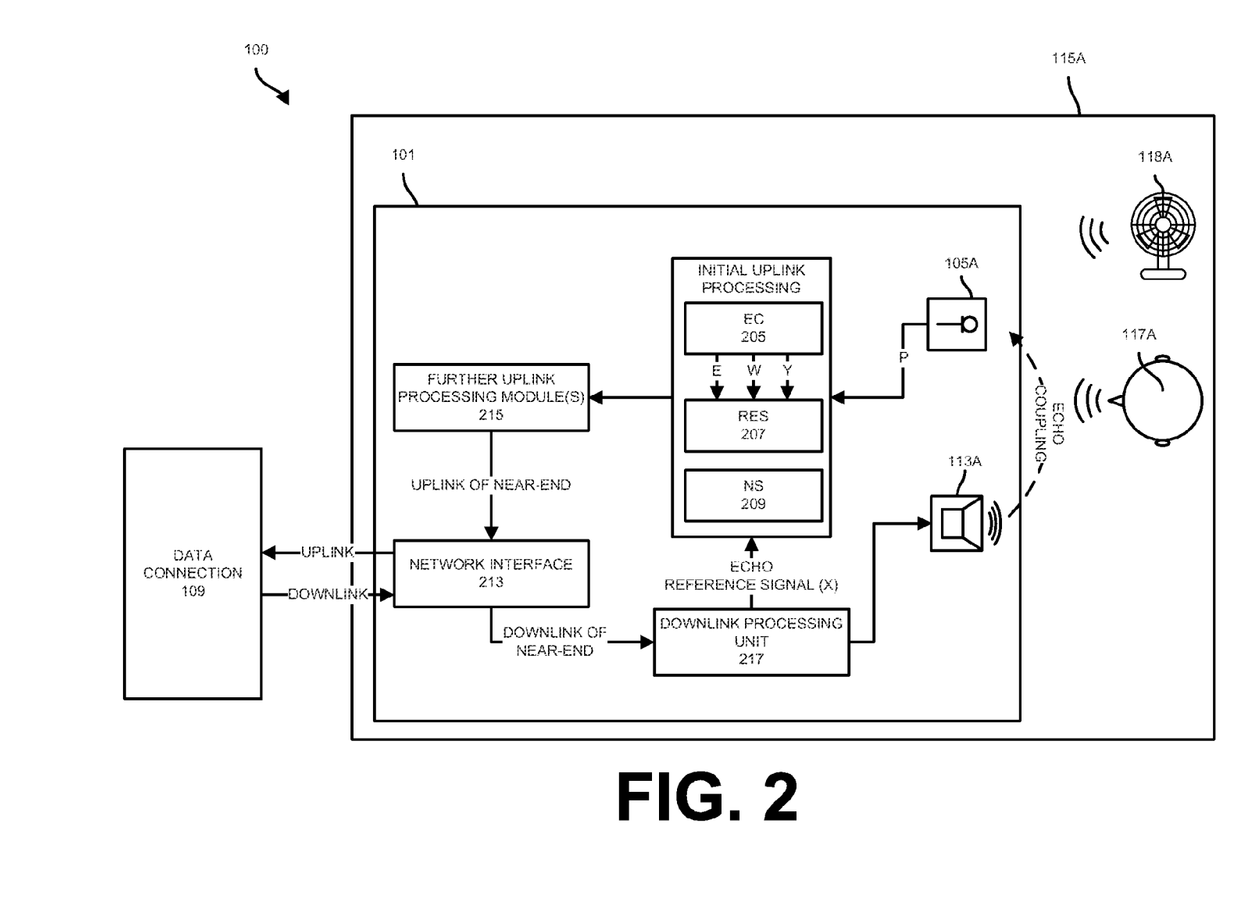
FIG. 2 shows a component diagram of the near-end system according to one embodiment.

FIG. 2 shows a component diagram of the near-end system 101 according to one embodiment. In one embodiment, the near-end system 101 may be any computing system that is capable of performing conferencing operations to transmit and receive captured audio signals/streams to/from the far-end system 103 over the data connection 109. For example, the near-end system 101 may be a laptop computer, a desktop computer, a tablet computer, a conference phone, and/or a mobile device (e.g., cellular telephone or mobile media player). Each element of the near-end system 101 shown in FIG. 2 will be described below by way of example. In one embodiment, the elements of the far-end system 103 may be similar or identical to the elements of the near-end system 101. Accordingly, although only the near-end system 101 is being shown and described below, it is understood that the far-end system 103 may be similarly configured.

As noted above, in one embodiment, the near-end system 101 may include a microphone 105A. The microphone 105A may sense sounds and convert these sensed sounds into electrical signals. The microphone 105A may be any type of acoustic-to-electric transducer or sensor, including a Micro-Electrical-Mechanical System (MEMS) microphone, a piezoelectric microphone, an electret condenser microphone, or a dynamic microphone. Although described in relation to a single microphone 105A, in some embodiments, the near-end system 101 may include multiple microphones 105A that operate independently or jointly as an array.

As noted above, the near-end system 101 may include a loudspeaker 113A for outputting audio received from the far-end system 103. As shown, the loudspeaker 113A may receive audio signals from the far-end system 103. In one embodiment the loudspeaker 113A may include a single transducer for producing sound. While in other embodiments the loudspeaker 113A may include multiple transducers for producing sound and operates as a loudspeaker array.

The one or more transducers within the loudspeaker 113A may be any combination of full-range drivers, mid-range drivers, subwoofers, woofers, and tweeters. Each of the transducers may use a lightweight diaphragm, or cone, connected to a rigid basket, or frame, via a flexible suspension that constrains a coil of wire (e.g., a voice coil) to move axially through a cylindrical magnetic gap. When an electrical audio signal is applied to the voice coil, a magnetic field is created by the electric current in the voice coil, making it a variable electromagnet. The coil and the transducers' magnetic system interact, generating a mechanical force that causes the coil (and thus, the attached cone) to move back and forth, thereby reproducing sound under the control of the applied electrical audio signal coming from a source (e.g., the far-end system 103).

Although shown as including one loudspeaker 113A, the near-end system 101 may include any number of loudspeakers 113A. Hereinafter, the near-end system 101 will be described as including a single loudspeaker 113A; however, as described above, it is understood that the near-end system 101 may operate in a similar fashion with multiple loudspeakers 113A.

In one embodiment, the near-end system 101 may include a network interface 213 for transmitting and receiving signals to/from the far-end system 103. For example, the near-end system 101 may transmit audio signals over the data connection 109 via the network interface 213. The network interface 213 may operate using any combination of wired and wireless protocols and standards, including the IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards.

As described above, the near-end system 101 and the far-end system 103 may conduct two-way voice communications. Echo is a common problem in two-way voice communications and is normally handled by a combination of a linear echo canceler (EC) 205 and a non-linear residual echo suppressor (RES) 207. A linear EC 205 adaptively estimates the echo path, processes an estimate of the echo (the linear echo estimate), and subtracts this estimate from the EC 205 input signal. Thus, the post-EC 205 signal has less echo and the near-end components (i.e., the desired signals sensed at the near-end location 115A) are often not distorted or are distorted to a low degree.

However, even with a good linear EC 205, depending on near-end 115A activity, the residual echo may still be audible in some cases. Here, the RES 207 may help further by reducing the echo in the post EC 205 signal using non-linear processing. However, by its very nature, a RES 207 may also alter near-end 115A desired signals (i.e., the voice of the near-end user 117A).

In general terms, the RES 207 may utilize the following steps: 1) estimate the residual echo in the signal received form the EC 205; 2) determine, in sub-bands, the signal-to-echo ratio (SER), where "the signal" is the desired near-end 115A signals such speech/voice from the near-end user 117A and other near-end 115A sources that do not come from the loudspeaker 113A; 3) translate these sub-band SERs into a suppression factor to be applied to each sub-band, where such suppression factors are usually attenuations in a range [minS, 0] dB; 4) smooth such suppression factors; and 5) apply such suppression factors to the post EC 205 signal to suppress echo. In some embodiments, minS≤0 dB is the minimum attenuation, which may be dynamic and a function of subbands. minS may also be dependent on factors such as the level of noise and or near-end speech. minS will be termed as a "gain floor" hereinafter. Based on the above steps used by the RES 207, it follows that accurate residual echo power spectrum estimation is one of the key factors to improve the echo suppression.

Example Approaches to Perform Residual Echo Estimation

One way to estimate the residual echo power spectrum is to leverage spectral characteristics shared by: 1) the far-end 115B signal X (i.e., a reference signal); 2) the linear echo estimate Y generated by the linear EC 205; and 3) the residual echo R (i.e., the post-EC 205 residual echo). One assumption that may be made is that the power spectrum of the residual echo R is the product of the power spectrum of X or Y and a transfer function T as defined in equations 1 and 2.

$$|R(\Omega,k)|^2 = |X(\Omega,k)|^2 * T(\Omega,k) \quad (1)$$

or $$|R(\Omega,k)|^2 = |Y(\Omega,k)|^2 * T(\Omega,k) \quad (2)$$

Here the variables X and Y are reused to denote spectrums of the respective signals, and $\Omega$ is a frequency bin index and k is an index in time, which denotes the block of signal being processed. Often the RES 207 may operate on blocks of N samples to facilitate estimation and frequency domain processing. In one embodiment, the most critical part in determining the residual echo R is the estimation of the transfer function $T(\Omega,k)$. In one embodiment, the transfer function $T(\Omega,k)$ may be calculated based on the coherence between the two complex spectra (e.g., equation (1)). For example, the far end signal X and the echo cancelled input to the RES 207 (i.e., E) may be used such that the coherence can be defined as in equations (3)-(7) shown below.

$$T(\Omega,k) = C_{XE}(\Omega,k) \quad (3)$$

$$C_{XE}(\Omega,k) = |S_{XE}(\Omega,k)|^2 / (S_{XX}(\Omega,k) S_{EE}(\Omega,k)) \quad (4)$$

$$S_{XE}(\Omega,k) = \alpha S_{XE}(\Omega,k-1) + (1-\alpha) X^*(\Omega,k) E(\Omega,k) \quad (5)$$

$$S_{EE}(\Omega,k) = \alpha S_{EE}(\Omega,k-1) + (1-\alpha) |E(\Omega,k)|^2 \quad (6)$$

$$S_{XX}(\Omega,k) = \alpha S_{XX}(\Omega,k-1) + (1-\alpha) |X(\Omega,k)|^2 \quad (7)$$

Using the above equations, the reference signal X needs to be appropriately time-aligned to the echo-cancelled signal E. Here "E" is used to denote both the signal and its spectrum, and the superscript "*" to be the complex conjugate. The values $S_{XE}$, $S_{EE}$, and $S_{XX}$ denote smoothed cross-spectrums and/or long-term mean removed spectrums. The value a is such that $0 <= \alpha <= 1$.

In other embodiments, the same coherence analysis may be done by comparing the linear echo estimate Y obtained from the EC 205 and the RES 207 input E, which is the primary EC 205 output. This may be done once the EC 205 has converged. It also avoids the additional step of aligning the far end signal X and RES 207 input signal E.

Potential Residual Echo Estimation Problems

The coherence analysis described above on two complex spectra may work if the residual echo is caused due to the EC 205 under-modeling the echo (e.g., the EC 205 filter length is shorter than the actual echo path) or if the EC 205 has only partially converged. However, if the EC 205 has a long enough filter length and behaves correctly, and has converged, the correlation between two complex spectra X or Y and E, may be weak due to the linear cancellation achieved by the EC 205.

Fundamentally, the EC 205 is taking advantage of correlation between the time or frequency domain versions of signals and thus also, by nature, removes correlation in the power spectra. More importantly, in the situation of severe echo, the linear cross correlation may be insufficient to estimate the non-linear echo. That is, when the echo and residual echo is very high, due to high playback levels and/or high levels of coupling between the loudspeaker 113A and microphone 105A, fundamentally coherence is insufficient on its own. The situation is even worse when near-end 115A ambient noise is involved. Thus, coherence based measures, in many cases (e.g., severe echoes), will tend to under-estimate suppression factors and under-estimate residual echo.

To address highly non-linear echo, a measurement-based residual echo estimation may be used. In this system, the transfer function T is pre-calibrated by experiments in quiet environments. This calibration may be hardware dependent and may be done for each set of loudspeaker 113A and microphone 105A. This system may also be scenario, application, and setting (e.g., volume setting) dependent. Hence, this approach may be very time-consuming and hard to generalize different use cases. Therefore, such an approach may not be advisable or applicable.

Near-End Distortion

As noted, one problem in some systems is the residual echo is often under-estimated in situations of severe echo, i.e., very strong playback volumes and coupling leading to very strong echo on the microphone 105A. Residual echo may also be under-estimated when the EC 205 is working well (i.e., converged to a good state).

Forming better residual echo estimates to be more in line with true echoes (i.e., higher levels of estimates when they are under-estimated) is one issue. Another issue that may arise in some traditional systems has to do with the fact that measured SERs drive the determination of what suppression-factor the RES applies in each subband. It is critical that both the measured SERs and calculated suppression-factors are determined carefully since in addition to suppressing (scaling down) residual echo these suppression-factors also may distort the desired near-end 115A signals. Indeed, as measures of residual echo increase, for example due to better residual echo estimation, the SERs drop and the suppression-factors naturally move towards zero, i.e., suppression-factors drive toward more attenuation. Attenuation may affect both near-end 115A sound/signals and residual echo in these traditional systems. Thus, better, including higher levels, of residual echo estimation can exacerbate problems with near-end distortion.

SERs can be particularly low in cases where the near-end 115A sound is only background ambient noise. The result in these low SER cases is that when the downlink is active and echoes are present, the ambient noise can be severely distorted in the uplink.

Accordingly, an objective of the system and method described herein is to both improve the residual echo estimation and to also reduce near-end distortion. Further, the system and method herein provides a flexible means to balance residual echo suppression and near-end distortion. Of particular interest is the case where the near-end 115A contains mainly low levels of background ambient noise.

To achieve these goals, the system and method described herein provides: 1) a better coherence-based approach that leverages the sub-band nature of coherence-based residual echo estimation, using sub-band-based coherence measures and upper-bound envelopes to guide better residual echo estimates; 2) joint estimation of the residual echo and a background stationary noise-floor; 3) better residual echo estimation by combining the above two measures with information on near-end activity (e.g., double-talk measures) to selectively adjust the residual-echo estimation in sub-bands; and 4) improved control of near-end 115A distortion. In one embodiment, the noise-floor estimate or some scaled version of this floor and the internally calculated signal-to-echo ratios are leveraged as additional guides/limits to help balance flexibly, and as needed, near-end 115A distortion with residual echo suppression.

As will be described in greater detail below, the system and method may obtain an initial residual echo estimate based on the normalized (i.e., mean-removed) cross-correlation between the power spectrum of the linear echo estimation Y and the power spectrum of the RES 207 input signal E in a sub-band manner. Often some "mean-removed" values of E and Y (now power spectra) may be used for the spectra that drive such coherence estimates. This may be necessary as power-spectra, by definition, are all positive functions. Thus, the coherence estimates should not always be interpreted as straight inner-products of E and Y, but rather a coherence of features that deviate from the local mean-removed spectra. This mean-removed cross-correlation, which is to be understood to be a vector of sub-band values, is referred hereinafter as the echo-leakage, well known to those versed in the state of the art.

The implicit assumption in using power spectra is that there might be little correlation in the two complex spectra because of the linear EC 205. However, there may be some level of correlation in the power spectral domain, and this may be leveraged if the residual echo and the near-end (desired) signals have inherently different power spectra (in individual blocks and over some average of concurrent blocks in time).

The use of sub-band echo-leakage values may also be important, and may help lead to better residual echo estimation across all bands. Here, the assumption is that if one sub-band shows a high degree of spectral correlation (i.e., high echo-leakage) it may point to the fact there also exist high levels of residual echo in other sub-bands even if such sub-bands do not show high echo-leakage values themselves.

An important part of the approach described herein is in the residual echo estimation adjustment to the initial residual echo estimation. In a severe echo situation due to non-linearity, strong loudspeaker 113A and microphone 105A coupling, near-end 115A disturbance, or echo path change, the initial residual echo estimation may be inaccurate. This inaccuracy may be the result of 1) an over-estimation and cause audible near-end distortion or 2) an under-estimation (as it more generally is) and mislead the RES 207 not to suppress residual echo. This residual echo estimation may be improved through two steps: 1) adjustment calculation and 2) control of this adjustment.

Figure 3:
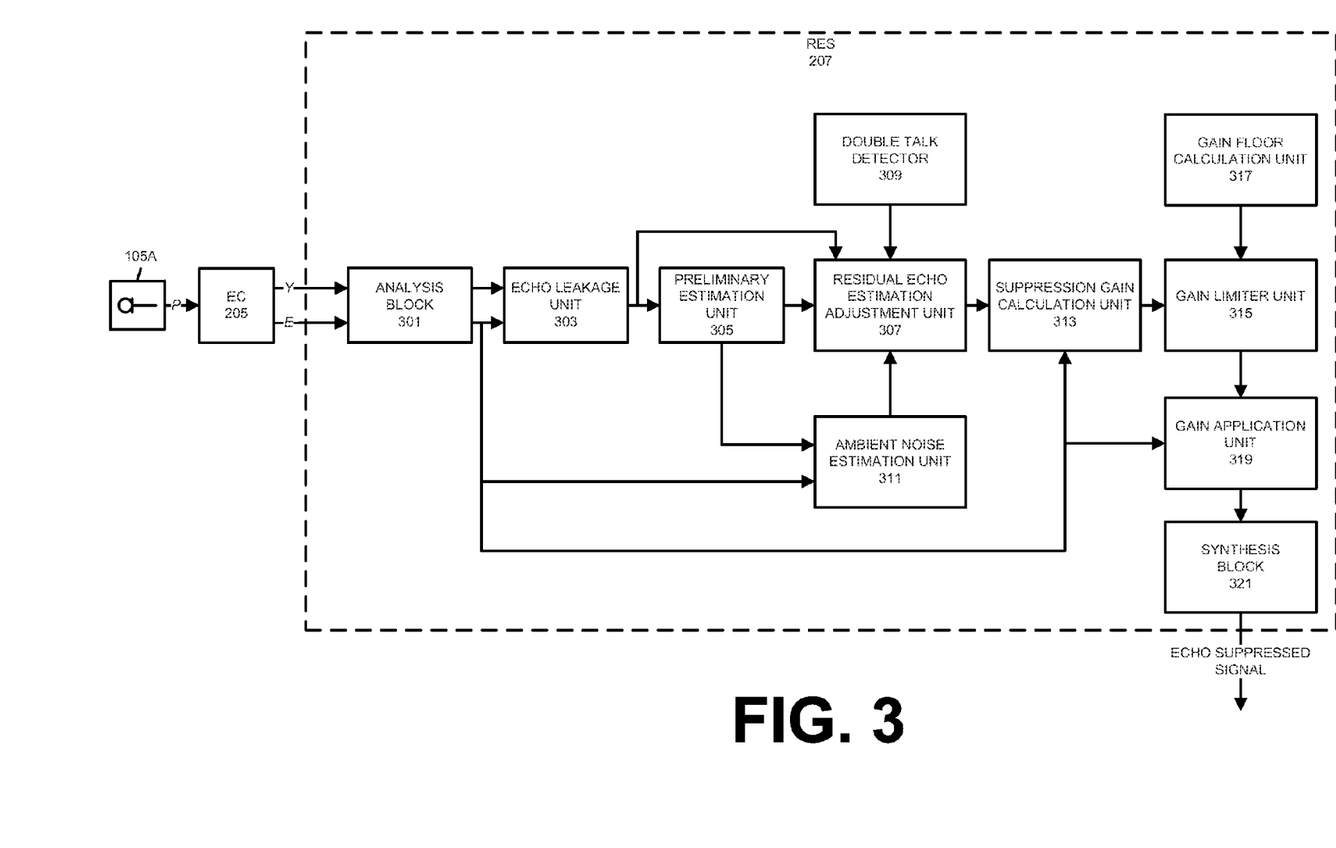
FIG. 3 shows a data flow diagram for a residual echo suppressor (RES) according to one embodiment.

FIG. 3 shows a dataflow diagram for the RES 207 according to one embodiment. Each element of the RES 207 may be implemented by one or more pieces of software and/or hardware operating on the near-end computing system 101. For example, one or more components of the RES 207 may be implemented by one or more hardware circuits and filters within the near-end computing system 101. In some embodiments, one or more of the elements with the RES 207 shown in FIG. 3 may be implemented by the same component. For example, in one embodiment, the double talk detector 309 is part of the EC 205 while in other embodiments the double talk detector 309 may be a separate unit. Data flow through the RES 207 shown in FIG. 3 will be described in relation to the method 400 for performing residual echo suppression shown in FIG. 4.

Figure 4:
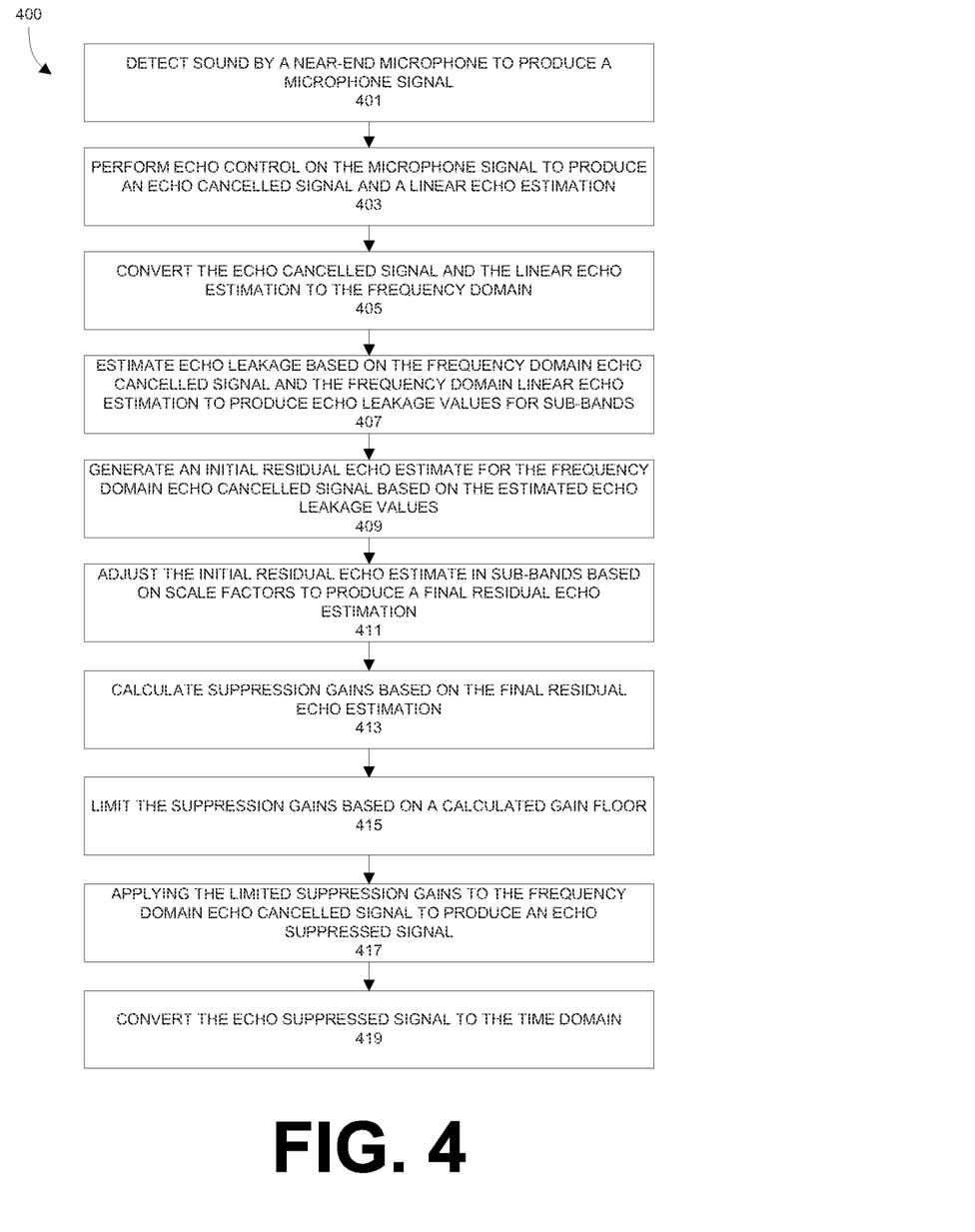
FIG. 4 shows a method for performing residual echo suppression according to one embodiment.

The method 400 may commence at operation 401 with the detection of sound by the microphone 105A at the near-end 115A to produce a primary signal P. In one embodiment, the sound detected at operation 401 and represented by the primary signal P may include sound produced by the near-end user 117A, sound produced by the loudspeaker 113A corresponding to sound detected at the far-end 115B and transmitted to the near-end 115A, and/or noise at the near-end 115A (e.g., sounds from a fan 118A). Although shown as sound from the fan 118A, in other embodiments background noise may be generated from any noise source.

In one embodiment, the primary signal P generated at operation 401 may be processed at operation 403 by the EC 205 to generate the echo-cancelled signal E and the linear echo estimation Y. The linear echo estimation Y represents the estimated linear echo present in the original signal P, which was processed by the EC 205. Accordingly, Y combined with E would produce the original signal P. Both of these signals (i.e., the echo cancelled audio signal E and the linear echo estimation Y) may be represented in the time domain as they are output from the EC 205 to the RES 207.

In one embodiment, the RES 207 may include an analysis block 301 for converting the echo cancelled audio signal E and the linear echo estimation Y received from the EC 205 to the frequency domain at operation 405. In one embodiment, a Fast Fourier Transform (FFT) may be used to convert the input signals E and Y received by the RES 207 from the EC 205 into the frequency domain. However, in other embodiments, any algorithm and/or set of circuits may be used at operation 405 in place of an FFT to covert the input signals E and Y received by the RES 207.

Following conversion to the frequency domain, operation 407 may estimate the echo leakage using the echo leakage unit 303. As noted above, the estimated echo leakage represents a coherence estimate between sub-bands of the signals E and Y. Accordingly, the estimated echo-leakage produced at operation 407 may be a vector of sub-band values. The use of sub-band echo-leakage values may be used to determine a preliminary estimate of residual echo and make adjustments to these estimates. Here, the assumption is that if one sub-band shows a high degree of spectral correlation (i.e., high echo-leakage) this may point to the fact of high levels of residual echo in other sub-bands even if such sub-bands do not show high echo-leakage values themselves.

Initial Residual Echo Estimation

At operation 409 an initial residual echo estimate may be computed using the preliminary estimation unit 305. In one embodiment, the initial residual echo estimate may be made using the same principle/approach explained above, but with some changes. In particular, the echo-leakage may be a function of sub-bands. For example, there can be an individual echo-leakage as a function of sub-bands (e.g., [0, 4 kHz], [4, 6 kHz], etc.).

Noting that sub-band leakages and even a global leakage on the [0, maxF kHz] full-band, where maxF is the Nyquist frequency, can be under-estimated; the sub-band leakages using comparisons may be adjusted. For example, the final sub-band leakage may be set as the maximum between the raw (original) leakage and the leakage for [0, 4 kHz]. Further, a maximum may be taken with respect to the full-band leakage. Another example would be that each of the final sub-band leakage values is set to its initial value modified by some fraction of the maximum of individual initial sub-band leakage values.

Residual Echo Estimate Adjustment

In one embodiment, the initial residual echo estimate may be adjusted in sub-bands at operation 411 using the residual echo estimation adjustment unit 307 based on scale factors. Scale factors for adjustment are calculated based on two observations.

First, the noise-floor estimation may be leveraged. In the case of only low ambient noise on the near-end 115A (e.g., no sound from the user 117A), the RES 207 input signal E only consists of residual echo and ambient noise. Here a joint estimate may be made of an expected (e.g., upper bound) residual echo R' as a function of the RES 207 input signal E and noise-floor estimate N as in equation (8). In this equation, λ and β may be user selected parameters. The ambient noise estimation may be obtained by the ambient noise estimation unit 311 through, for example, minimal statistics.

$$|R'(\Omega,k)|^2 = \lambda(|E(\Omega,k)|^2 - \beta|N(\Omega,k)|^2 \tag{8}$$

For the joint estimation to be consistent, it must be true that $|R'(\Omega, k)|^2 \geq 0$ and $|N(\Omega, k)|^2 \geq 0$. Such constraints may lead to re-evaluation of both noise-floor and upper bounds residual echo estimated. Both the noise estimate, parameters λ and β can also change with statistics "W" obtained from the EC 205, including correlations between X and P and the relative energy of E and P. These statistics help define different conditions such as low ambient noise conditions, double-talk conditions, and echo-dominant conditions.

Second, in synthetic test cases used in investigating the invention (in which the true residual echo is known), it was noticed that the initial residual echo estimation often well matches the true residual echo in sub-band spectral peaks, even when the echo or residual echo does not have such peaks. This indicates the upper bounds of residual echo R" in each sub-band could be constrained by the sub-band spectral peaks as shown in equation (9) below.

$$|R''(\Omega,k)|^2 = \max_{\Omega \text{ in subband } "Q"}(|R(\Omega,k)|^2) + \delta \text{ for } \Omega \text{ in subband} "Q" \tag{9}$$

Here, $\max_{\Omega \text{ in subband } "Q"}(|R(\Omega, k)|^2)$ denotes the peak value in a given sub-band Q and δ is a user selected offset. The offset δ may also be a multiplicative factor (i.e., a dB domain adjustment to the maximum value).

This maxima tracking produces essentially an upper-bound envelope, which is calculated for all sub-bands. The envelope can also be smoothed by taking the maximum for a given sub-band Q1 over one or more adjacent sub-bands Q1, Q2, and Q3. This may be presented by equation (10) below.

$$|R''(\Omega,k)|^2 = \max_{\Omega \text{ in sub-band } "Q1,Q2,Q3"}(|R(\Omega,k)|^2) + \delta \text{ for } \Omega \text{ in sub-band Q1} \tag{10}$$

The prospective adjustments sf(Ω, k) to be made to the initial residual echo estimation is defined as a function of the minimum of $|R'(\Omega, k)|^2$ and $|R''(\Omega, k)|^2$, and $|R(\Omega, k)|^2$ in equation (11).

$$sf(\Omega,k) = \min(|R'(\Omega,k)|^2, |R''(\Omega,k)|^2)/|R(\Omega,k)|^2 \tag{11}$$

This scale factor may be later limited by a threshold "Th" as shown in equation (12), the threshold being a user selected parameter for a specific scenario. These thresholds may be a function of the state information provided by "W". In particular, if it is known that there is a strong echo situation with little double-talk or near-end activity, such thresholds may be set higher. Conversely, if there is a double-talk situation or a weak echo situation such thresholds may be set lower to represent the fact that leakage and other values, such as spectral peaks, may be less likely related to residual echo. This is explained in more detail later.

$$sf(\Omega,k) = \min(sf(\Omega,k), Th(\Omega,k)) \tag{12}$$

Figure 5:
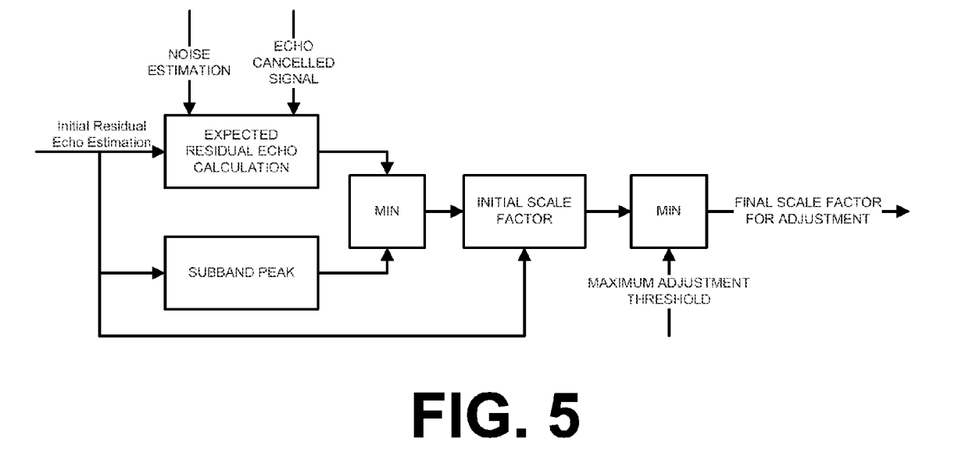
FIG. 5 shows a process/logic of determining a scale factor according to one embodiment.

FIG. 5 illustrates the process of determining a scale factor as described above.

Unlike the adjustments in some systems, the adjustment of the initial residual echo estimate described above at operation 411 does not need fine tuning. Further, these adjustments can also adapt based on statistics, which determine double-talk activity. Moreover, these adjustments may also be a function of sub-bands (e.g., thresholds for low and higher frequency bands may differ). Thus Th(Ω, k) may be considered a function of both frequency and time (block index).

Control of Adjustment Scale-Factors

Figure 6:
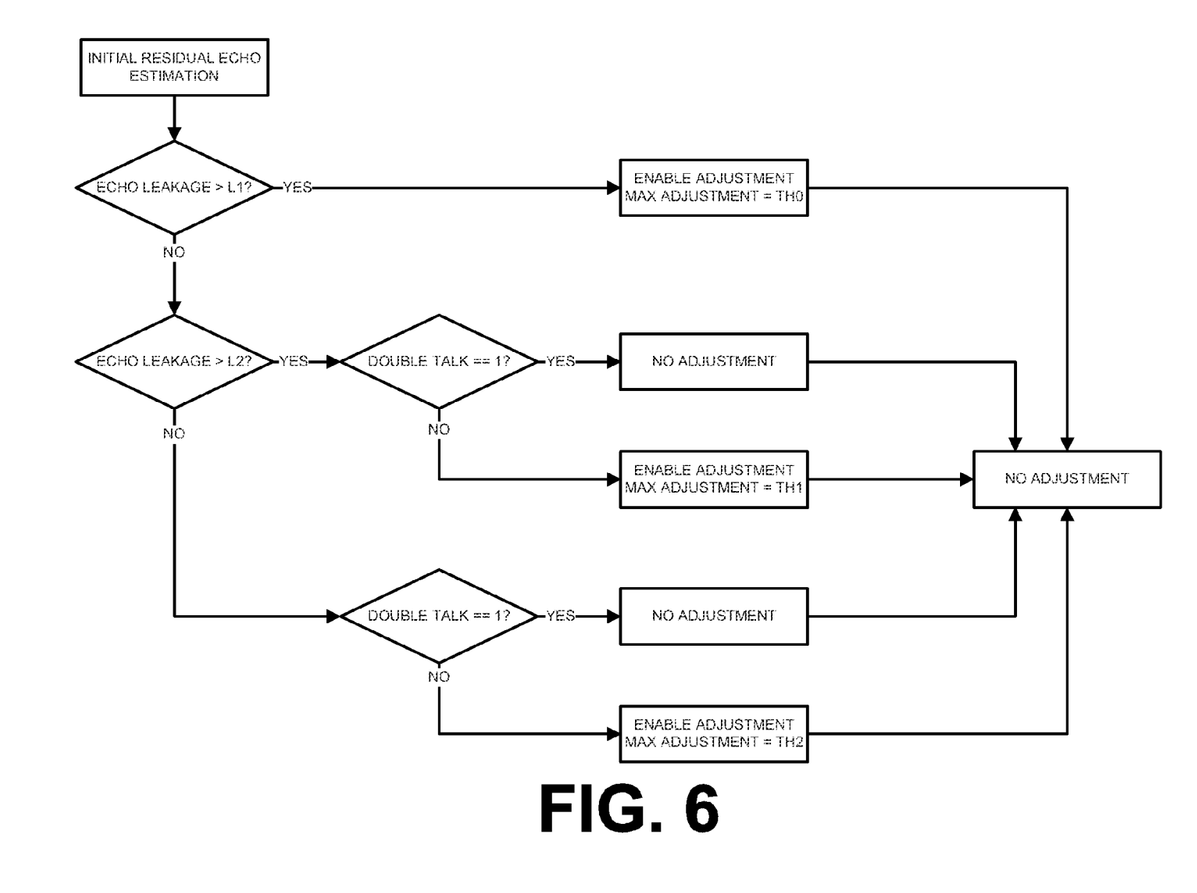
FIG. 6 shows a process/logic for adjusting scale-factors according to one embodiment.

To minimize the distortion to a near-end speech signal, a normalized cross correlation based double talk detector 309 and the echo leakage may be used to jointly control the residual echo estimation adjustment at operation 411 using the residual echo estimation adjustment unit 307. In one embodiment, the double talk detector 309 is part of the EC 205 while in other embodiments the double talk detector 309 may be a separate unit. The control logic flow for adjusting scale-factors according to one embodiment is illustrated in FIG. 6.

The EC 205 convergence status is quantified by the echo-leakage value. In one embodiment, the double talk metric given by the double talk detector 309 may be useful only when the EC 205 is converged. In one embodiment, this unit 309 can be part of the EC 205 and such statistics are passed with information included in "W". Depending on different scenarios defined by the predefined echo leakage valued L1 and L2, the adjustment is selectively applied using the scale factor threshold values Th0, Th1, and Th2 as shown in FIG. 6 and described below:

(A) When echo leakage is very high (i.e., echo leakage>L1), the EC 205 is likely not yet converged, residual echo is expected to be significant and the double talk detector 309 might not be reliable. Though leakages are high, it has been found that the leakages may not be high enough to accurately characterize the level of residual echo. In such cases, the scale factor thresholds may be set high (i.e., Th0) and the initial residual echo may be scaled up significantly.

(B) When the EC 205 is converged to some extent (i.e., L2<echo leakage≤L1, the double talk detector 309 may be trusted. Here, the algorithm only allows the initial residual echo to be scaled in single-talk, or single-talk with possibly a low level of background noise by Th1.

(C) When the EC 205 is fully converged (i.e., echo leakage≤L1 and echo leakage≤L2), there may be a high confidence about double talk detector behavior. Here, when in single-talk-only, the initial residual echo is scaled up with a factor limited by Th2. This may also happen in the case of single-talk with possibly a low level of background noise. The maximal adjustment should be less than case (B) (i.e., Th2<Th1), since the EC 205 already cancels the echo to the best of its capability.

Additional Controls on Near-End Distortion

At this point, the improved residual echo estimate determined at operation 411 drives a suppression factor calculation for each sub-band (where these sub-bands may be different from those used in echo-leakage and residual echo estimation). Sub-bands with low SER values generally trigger higher suppression factors (i.e., factors that attenuate the sub-band more).

This suppression affects both the residual echo and near-end signal. To control this suppression, suppression limits (i.e., a minimum value in dB) are imposed that individual suppression factors cannot go below. These can be tuned for single-talk and double-talk, and can be used to limit, somewhat, near-end distortion. However, additional control may be needed in order to more appropriately control near-end distortion.

Here, the focus is particularly on the distortion of the background noise. Such a case could be the use of this system in a vehicle, on a street, or in a noisy room. The noise-floor estimate (a power spectrum estimate of the background noise), mentioned previously, is used to provide additional limits on the suppression factors that may be applied. In particular, suppression factors are limited so that they do not suppress the signal more than a given dB limit below the noise-floor. For example, if this limit is 0 dB, the power-spectrum of the output of the RES 207 will never go below the noise-floor and the spectral distortion of the general background noise characteristic on the processed signal is strongly controlled to conform to that in E.

In order to render the post-RES 207 residual echo less perceptible, some sub-bands will need to be suppressed (e.g., those with low SER) below this noise-floor. In one embodiment, a "noise-floor" offset is chosen, which can be tuned for low and high frequencies, and single and double-talk, individually. Masking principles may be used to guide this offset. For example, if background noise is considered in each sub-band to be more Gaussian like and less tone like, then masking principles suggest that a minimum offset of −6 dB would allow for some of the background noise to mask post-RES 207 residual echo.

Furthermore, it should be noted that if the RES 207 works in conjunction with a noise-suppressor (NS) 209, which will change this noise-floor, for the purpose of guiding suppression floors this noise-floor should be adjusted accordingly to account for the action of the NS 209.

In one embodiment, the final residual echo estimate determined at operation 411 together with the RES 207 input E determines the signal-to-echo ratio and this ratio is used to calculate the suppression gains by the suppression gain calculation unit 313 at operation 413. The suppression gains may then be limited by the gain limiter 315 based on inputs from the gain floor calculation unit 317 at operation 415 to keep the near-end signal from being overly distorted.

Figure 7:
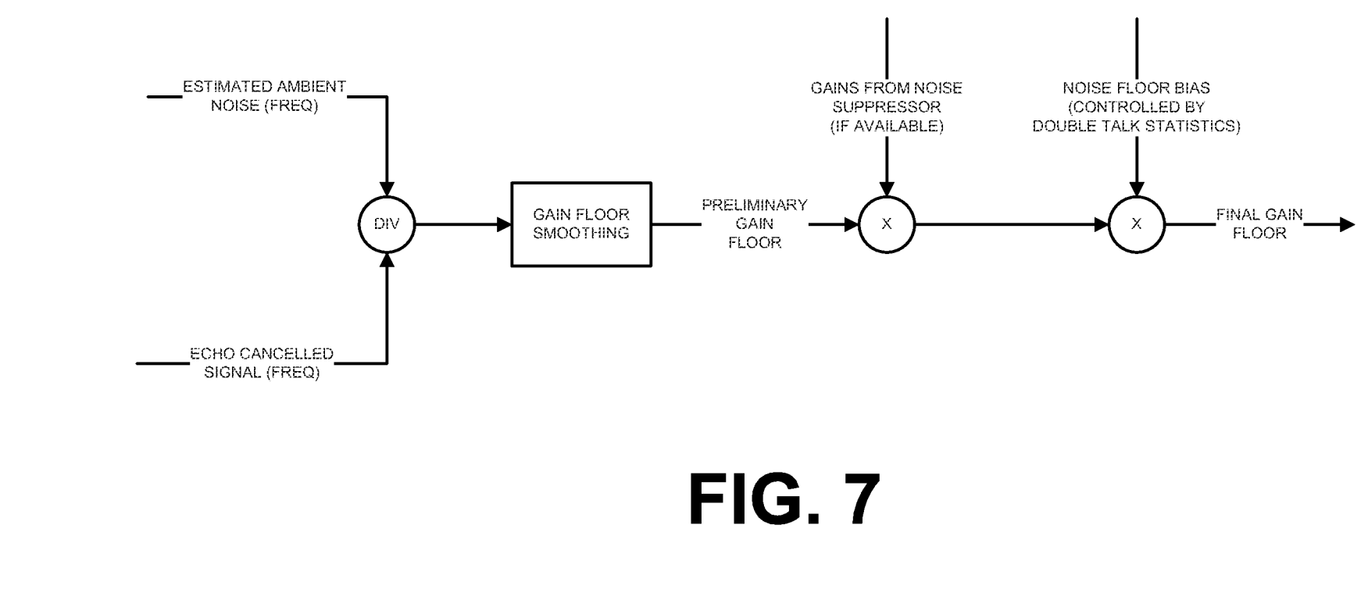
FIG. 7 shows a process/logic for a gain floor calculation unit according to one embodiment.

In one embodiment, the gain floor calculation unit 317 may be implemented as shown in FIG. 7. As shown, the ratio of the estimated ambient noise and the RES 207 input E determines the initial gain floor. This initial gain floor values may then be modulated by the gains from the NS 209. To ensure that if the NS 209 already removed some ambient noise before the RES 207, the RES 207 must suppress the residual echo more aggressively, because there is not much noise to mask the residual echo. If there is no NS 209 before the RES 207, then NS 209 gains are set to unity. The gain floor values may be further offset by noise floor bias values. These noise floor bias values are different for single talk and double talk (indicated by the double talk statistics in FIG. 7). In particular, the noise floor may be biased more (lowered more) in single talk than double-talk to allow the residual echo suppression to be more aggressive during single-talk. Use of the less biasing (less lowering of the floor) in double-talk is performed since the near end sounds could potentially mask the residual echo. Further, this lower biasing better ensures that the near-end sounds are not overly distorted. The biases may also change as a function of frequency. For example, it is known that non-linear echoes due to loudspeaker distortion may be more of a problem in higher frequency bands. Thus, for higher frequency bands the floor may be biased down more. The final gain floor is used to limit the suppression gains by the gain limiter unit 315 at operation 415. The final suppression gains may thereafter be applied to the RES 207 input E by the gain application unit 319 at operation 417. Thereafter, the RES 207 suppressed signal input may then be synthesized back to the time domain by the synthesis block 321 at operation 419. The resulting echo suppressed signal from the RES 207 may be further processed by the further uplink processing module(s) 215, including processing by an echo gate, before being transmitted via the network interface 312 and the data connection 109 to the far-end system 103.

As described above, the RES 207 provides an improved residual echo estimation and consequent suppression. In particular, the RES 207 described herein: 1) provides a more accurate coherence-based approach where the sub-band nature of coherence-based residual echo estimation is leveraged using sub-band-based coherence measures and upper-bound envelopes to guide residual echo estimates; 2) provides joint estimation of the residual echo and a background stationary noise-floor; 3) provides more accurate residual echo estimation by combining the above two measures with information on near-end activity to selectively adjust the residual-echo estimation in sub-bands; and 4) provides improved control of near-end distortion by leveraging the noise-floor estimate and the internally calculated signal-to-echo ratios as additional guides/limits to help balance, flexibly, and as needed, near-end distortion with residual echo suppression. The resultant residual echo suppressor design provides significant improvement in both residual echo suppression and background noise preservation.

As explained above, an embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for suppressing residual echo, comprising:
   detecting sound by a microphone at a near-end location to produce a microphone signal;
   performing echo cancellation on the microphone signal to remove a portion of echo, wherein performance of echo cancellation generates an echo cancelled signal and an estimate of a linear echo component of the echo;
   converting the echo cancelled signal and the estimate of the linear echo component to frequency domain;
   estimating echo leakage based on the frequency domain echo cancelled signal and the frequency domain estimate of the linear echo component to produce initial echo leakage values for sub-bands of the frequency domain echo cancelled signal;

adjusting the initial echo leakage values based on a statistical analysis between the initial echo leakage values to generate final echo leakage values; and generating a final residual echo estimate based on the final echo leakage values.

2. The method of claim 1, wherein the final echo leakage values represent coherence estimates between sub-bands of the frequency domain representations of the echo cancelled signal and the frequency domain representations of the estimate of the linear echo component, such that the final echo-leakage values are a vector of sub-band values.

3. The method of claim 1, further comprising:
computing suppression gains based on the final residual echo estimate and the frequency domain echo cancelled signal;
applying the suppression gains to the echo cancelled signal to produce an echo suppressed signal; and
converting the echo suppressed signal to time domain for transmission to a far-end location.

4. The method of claim 3, further comprising:
calculating a gain floor based on one or more of 1) an estimated ambient noise level in the frequency domain echo cancelled signal; 2) gains from a noise suppressor; and 3) a noise floor bias values associated with the presence or absence of double-talk, echo level, near-end sound level, and background noise level, in the frequency domain echo cancelled signal; and
limiting the suppression gains based on the gain floor.

5. The method of claim 1, wherein the sound detected by the microphone and represented by the microphone signal includes one or more of near-end sound and sound produced by a near-end loudspeaker corresponding to sound detected at a far-end location and transmitted to the near-end location for playback.

6. The method of claim 1, wherein the final echo leakage values are computed as, or adjusted by, maximums of full-band echo leakage and the initial echo leakage values for each corresponding sub-band.

7. The method of claim 1, further comprising:
generating an initial residual echo estimate for the frequency domain echo cancelled signal based on the final echo leakage values;
computing sub-band and individual frequency scale factors based on one or more of the initial residual echo estimate, information on a presence or an absence of double-talk, echo level, near-end sound level, and background noise level, in the echo cancelled signal; and
adjusting the initial residual echo estimate in sub-bands based further on the frequency scale factors to produce the final residual echo estimate.

8. The method of claim 7, wherein the frequency scale factors are computed based on peak values of the initial residual echo estimate in each sub-band wherein the frequency scale-factor used to form the final residual echo estimate in a given sub-band is set to allow the final residual echo estimate for each frequency in the sub-band to be up to a fraction of the given sub-band peak or a function of the peaks across multiple sub-bands.

9. The method of claim 7, further comprising:
generating the frequency scale factors for each sub-band, wherein the frequency scale factors are generated based on one or more of 1) a noise estimate; 2) the frequency domain echo cancelled signal; 3) peaks of initial residual echo estimates in one or more sub-bands; and 4) a maximum adjustment threshold.

10. The method of claim 9, wherein generating a frequency scale factor for a sub-band comprises:

estimating an expected residual echo calculation based on the initial residual echo estimation, the noise estimation, and the frequency domain echo cancelled signal, wherein the expected residual echo is a linear combination of two or more of the initial residual echo estimation, the noise estimation, and the frequency domain echo cancelled signal;
determining a sub-band peak in the initial residual echo estimation in one or more sub-bands;
computing an initial frequency scale factor based on a minimum of a scaled sub-band peak, the sub-band peak, and the expected residual echo calculation; and
limiting the initial frequency scale factor by the maximum adjustment threshold.

11. The method of claim 10, wherein generating the frequency scale factors for sub-bands further comprises:
adjusting the frequency scale factors based on comparisons of estimated echo-leakage with echo-leakage thresholds and detection of double talk.

12. The method of claim 11, further comprising:
determining the presence of double talk in the frequency domain echo cancelled signal; and
selecting for each sub-band, a leakage value based on the final echo leakage values;
when the selected echo leakage value for a frequency band is above a first echo leakage threshold, the maximum adjustment threshold is set to a first value,
when the selected echo leakage value for the frequency band is below the first echo leakage threshold and above a second echo leakage threshold and double talk is not detected in the frequency domain echo cancelled signal, the maximum adjustment threshold is set to a second value, and
when the selected echo leakage value for the frequency band is below the first and second echo leakage thresholds and double talk is not detected in the frequency domain echo cancelled signal, the maximum adjustment threshold is set to a third value,
wherein the first value is greater than the second value and the second value is greater than the third value.

13. A method for suppressing residual echo, comprising:
detecting sound by a microphone at a near-end location to produce a microphone signal;
performing echo cancellation on the microphone signal to remove a portion of echo, wherein performance of echo cancellation generates an echo cancelled signal and an estimate of a linear echo component of the echo;
converting the echo cancelled signal and the estimate of the linear echo component to frequency domain;
generating an initial residual echo estimate for the frequency domain echo cancelled signal;
computing sub-band and individual frequency scale factors based on one or more of the initial residual echo estimate, information on a presence or an absence of double-talk, echo level, near-end sound level, and background noise level, in the echo cancelled signal; and
adjusting the initial residual echo estimate in sub-bands based on the frequency scale factors to produce a final residual echo estimate.

14. The method of claim 13, wherein the frequency scale factors are computed based on peak values of the initial residual echo estimate in each sub-band, wherein the frequency scale-factor used to form the final residual echo estimate in a given sub-band is set to allow the final residual echo estimate for each frequency in the sub-band to be up to a fraction of the given sub-band peak or a function of the peaks across multiple sub-bands.

15. The method of claim 13, further comprising:
computing suppression gains based on the final residual echo estimate and the frequency domain echo cancelled signal;
applying the suppression gains to the echo cancelled signal to produce an echo suppressed signal; and
converting the echo suppressed signal to time domain for transmission to a far-end location.

16. The method of claim 13, further comprising:
estimating echo leakage based on the frequency domain echo cancelled signal and the frequency domain estimate of the linear echo component to produce initial echo leakage values for sub-bands of the frequency domain echo cancelled signal; and
adjusting the initial echo leakage values based on a statistical analysis between the initial echo leakage values to generate final echo leakage values, wherein the final residual echo estimate is based on the final echo leakage values; and wherein the final echo leakage values represent coherence estimates between sub-bands of the frequency domain representations of the echo cancelled signal and the frequency domain representations of the estimate of the linear echo component, such that the final echo leakage values are a vector of sub-band values.

17. The method of claim 13, further comprising:
estimating echo leakage based on the frequency domain echo cancelled signal and the frequency domain estimate of the linear echo component to produce initial echo leakage values for sub-bands of the frequency domain echo cancelled signal; and
adjusting the initial echo leakage values based on a statistical analysis between the initial echo leakage values to generate final echo leakage values, wherein the final residual echo estimate is based on the final echo leakage values; and wherein the final echo leakage values are computed as, or adjusted by, maximums of the full-band echo leakage and the initial echo leakage values for each corresponding sub-band.

18. The method of claim 13, further comprising:
generating the frequency scale factors for each sub-band, wherein the frequency scale factors are generated based on one or more of 1) a noise estimate; 2) the frequency domain echo cancelled signal; 3) peaks of initial residual echo estimates in one or more sub-bands; and 4) a maximum adjustment threshold.

19. The method of claim 18, wherein generating a frequency scale factor for a sub-band comprises:
estimating an expected residual echo calculation based on the initial residual echo estimation, the noise estimation, and the frequency domain echo cancelled signal, wherein the expected residual echo is a linear combination of two or more of the initial residual echo estimation, the noise estimation, and the frequency domain echo cancelled signal;
determining a sub-band peak in the initial residual echo estimation in one or more sub-bands;
computing an initial frequency scale factor based on the minimum of a scaled sub-band peak and the expected residual echo calculation; and
limiting the initial frequency scale factor by the maximum adjustment threshold.

20. The method of claim 19, wherein generating the frequency scale factors for sub-bands further comprises:
adjusting the frequency scale factors based on comparisons of estimated echo-leakage with echo-leakage thresholds and detection of double talk.

21. A system for suppressing residual echo, comprising:
a microphone to detect sound at a near-end location to produce a microphone signal;
an echo canceller to perform echo cancellation on the microphone signal to remove linear echo, wherein performance of echo cancellation generates an echo cancelled signal and an estimate of a linear echo component;
an analysis block to convert the echo cancelled signal and the estimate of the linear echo component to frequency domain;
an echo leakage unit to 1) estimate echo leakage based on the frequency domain echo cancelled signal and the frequency domain estimate of the linear echo component to produce initial echo leakage values for sub-bands of the frequency domain echo cancelled signal and 2) adjust the initial echo leakage values based on a statistical analysis between the initial echo leakage values to generate final echo leakage values; and
a residual echo estimation adjustment unit to generate a final residual echo estimate based on the final echo leakage values.

22. The system of claim 21, further comprising:
a preliminary estimation unit to generate an initial residual echo estimate for the frequency domain echo cancelled signal based on the final echo leakage values,
wherein the residual echo estimation adjustment unit further 1) computes sub-band and individual frequency scale factors based on one or more of the initial residual echo estimate, information on a presence or an absence of double-talk, echo level, near-end sound level, and background noise level, in the echo cancelled signal and 2) adjusts the initial residual echo estimate in sub-bands based further on the frequency scale factors to produce the final residual echo estimate.

23. The system of claim 22, wherein the frequency scale factors are computed based on peak values of the initial residual echo estimate in each sub-band, wherein the frequency scale-factor used to form the final residual echo estimate in a given sub-band is set to allow the final residual echo estimate for each frequency in the sub-band to be up to a fraction of the given sub-band peak or a function of the peaks across multiple sub-bands.

24. The system of claim 23, wherein the frequency scale factors are generated for each sub-band and are generated based on one or more of 1) a noise estimate; 2) the frequency domain echo cancelled signal; 3) peaks of initial residual echo estimates in one or more sub-bands; and 4) a maximum adjustment threshold.

25. The system of claim 21, wherein the final echo leakage values are computed as, or adjusted by, maximums of full-band echo leakage and the initial echo leakage values for each corresponding sub-band.

26. The system of claim 21, wherein the final echo leakage values represent coherence estimates between sub-bands of the frequency domain representations of the echo cancelled signal and the frequency domain representations of the estimate of the linear echo component, such that the final echo-leakage values are a vector of sub-band values.

* * * * *